US006257479B1

(12) United States Patent
Litwinski et al.

(10) Patent No.: US 6,257,479 B1
(45) Date of Patent: Jul. 10, 2001

(54) TOOLING AND METHODS FOR CIRCUMFERENTIAL FRICTION STIR WELDING

(75) Inventors: Edward Litwinski, Mission Viejo; Leo Delangis, Lomita; Juan Valdez, South Gate, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/456,096

(22) Filed: Dec. 7, 1999

(51) Int. Cl.[7] .......................... B23K 20/12; B23K 31/02; B23K 37/00; B23K 37/04
(52) U.S. Cl. ...................... 228/112.1; 228/2.1; 228/4.1; 228/44.3; 228/44.5
(58) Field of Search .................. 228/112.1, 2.1, 228/4.1, 6.1, 44.3, 44.5, 49.3

(56) References Cited

U.S. PATENT DOCUMENTS

| | | | |
|---|---|---|---|
| 3,765,665 | * | 10/1973 | Work ...................................... 269/27 |
| 3,920,171 | * | 11/1975 | Clavin ..................................... 228/44 |
| 3,937,382 | * | 2/1976 | Cunningham et al. ................. 228/49 |
| 3,979,041 | * | 9/1976 | Kaneyama et al. .................... 228/49 |
| 4,273,985 | * | 6/1981 | Paton et al. ........................... 219/101 |
| 4,306,134 | * | 12/1981 | Slavens et al. .................... 219/60 A |
| 4,582,241 | * | 4/1986 | Johnson ............................... 228/49.3 |
| 5,288,005 | * | 2/1994 | Beakley et al. ..................... 228/49.3 |
| 5,316,202 | * | 5/1994 | Murray et al. ........................ 228/5.5 |
| 5,356,067 | * | 10/1994 | Leduc ................................... 228/44.5 |
| 5,435,479 | * | 7/1995 | Puzey et al. ......................... 228/44.5 |
| 5,468,334 | * | 11/1995 | Searle ................................... 156/580 |
| 5,535,938 | * | 7/1996 | Leduc ................................... 228/212 |
| 5,568,893 | * | 10/1996 | Depperman ......................... 228/44.5 |
| 5,816,475 | * | 10/1998 | Brookhouse ........................ 228/49.3 |

* cited by examiner

Primary Examiner—Clifford C. Shaw
Assistant Examiner—Ridia Pittman
(74) Attorney, Agent, or Firm—Alston & Bird LLP

(57) ABSTRACT

A back-up tooling apparatus for supporting the inner side of a hollow cylindrical workpiece during a circumferential friction stir weld includes a plurality of arcuate shoes configured to mate end-to-end to form a substantially continuous ring, and an expandable support for supporting the shoes and operable to retract and expand the shoes inward and outward. The expandable support includes at least one rotatable feed screw and central support members mounted on the feed screw or screws and pivotally connected to the shoes by support arms. The central support members are moved axially toward or away from each other for expanding or retracting the shoes. The shoes in one embodiment overlap in the circumferential direction, and a seal material is disposed between mating end faces of adjacent shoes. A restraining device is provided for clamping about the workpiece to reduce thermal expansion thereof. Cable-and-winch and geared drive devices are provided for rotatably driving the workpiece from its outer surface.

16 Claims, 3 Drawing Sheets

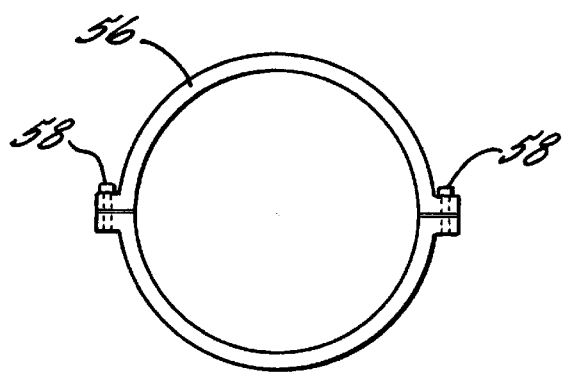
fig.6.
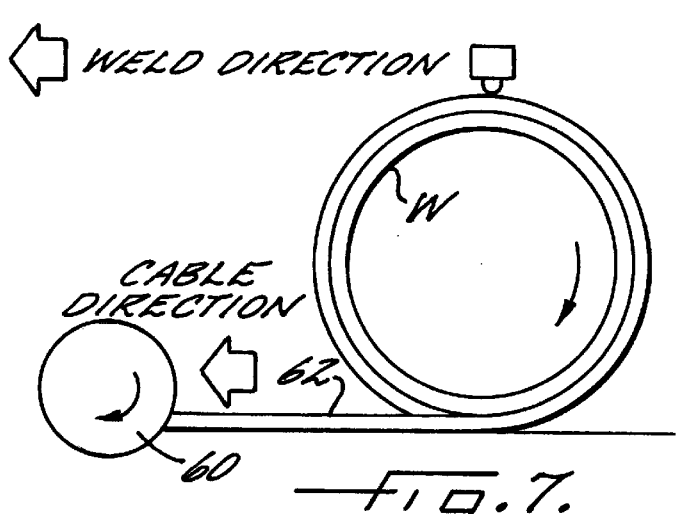 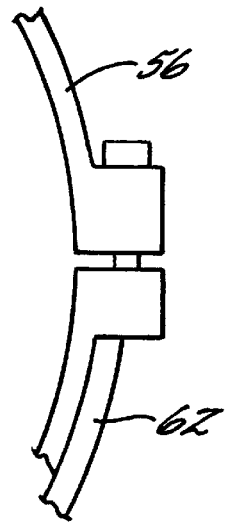
fig.7.
fig.8.
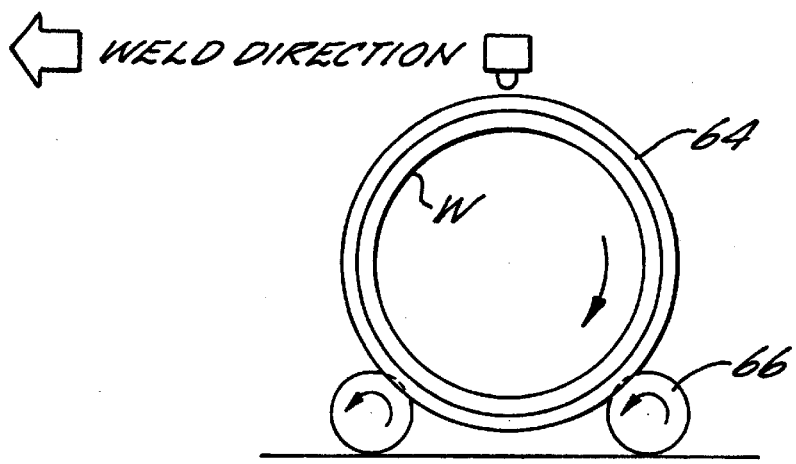
fig.9.

TOOLING AND METHODS FOR CIRCUMFERENTIAL FRICTION STIR WELDING

FIELD OF THE INVENTION

The invention relates to friction stir welding and, more particularly, to tooling and methods for making circumferential friction stir welds on cylindrical workpieces such as tanks, rocket casings, and the like.

BACKGROUND OF THE INVENTION

Friction stir welding is a relatively new technology that has been developed for welding aluminum alloys and other materials. The friction stir welding process generally involves engaging the material of two adjoining workpieces on either side of a joint by a rotating stir pin or spindle. Force is exerted to urge the spindle and the workpieces together, and frictional heating caused by the interaction between the spindle and the workpieces results in plasticization of the material on either side of the joint. The spindle is traversed along the joint, plasticizing material as it advances, and the plasticized material left in the wake of the advancing spindle cools and solidifies to form a weld.

It will be appreciated that large forces must be exerted between the spindle and the workpieces in order to apply sufficient pressure to the workpieces to cause plasticization of the material. For instance, for friction stir welding an aluminum alloy plate of ¼-inch thickness, forces of up to 4000 pounds or more may have to be exerted between the spindle and the plate. In a conventional friction stir welding process, these large forces are absorbed at least partially by a back-up member which engages the workpieces on the "back side" of the weld opposite from the spindle. Where the workpieces have sufficient structural strength and rigidity, part of the welding forces may be absorbed by the workpieces themselves. However, in many cases the workpieces are semi-flexible structures which are incapable of supporting and absorbing the large forces involved in a friction stir welding process. Accordingly, the back-up member is usually supported by a substantial support structure.

A number of challenges are presented in friction stir welding a hollow cylindrical workpiece. Because of limited space inside the workpiece, the rotating friction stir welding tool generally must engage the workpiece from the outside and a suitable back-up tool must support the inner surface of the workpiece along its entire circumference to counteract the large inward forces exerted on the workpiece by the welding tool. A one-piece or fixed geometry back-up tool is impractical, and could not be used in workpieces in which the opening in the workpiece through which the back-up tool must be inserted is smaller in diameter than the portion of the workpiece to be welded. Thus, the back-up tool must be constructed from a plurality of members that can be placed inside the workpiece and then assembled into a full-circumference back-up tool.

The multi-component construction of the back-up tool is not optimum from the standpoint of rigidity of the tool. Tool rigidity is important because, unless the back-up tool has sufficient rigidity, the welding forces can cause deformations of the workpiece, leading to problems such as irregular welds. Accordingly, one challenge in friction stir welding hollow cylindrical workpieces is providing a back-up tool that can fit through an opening in the workpiece and can be assembled into a full-circumference back-up tool having sufficient rigidity to prevent excessive deformation of the workpiece during welding. The back-up tool should also be capable of being assembled and disassembled relatively quickly.

Another problem encountered in friction stir welding a cylindrical structure along a circumferential weld path is that the heat generated during the welding process tends to cause radial growth of the structure through thermal expansion. As a result, the welding tool tends to become buried in the weld metal, causing excessive metal flash and voiding.

Still another problem in friction stir welding a cylindrical structure relates to the rotational driving of the structure. The friction stir welding tool remains in one place and the cylindrical workpiece is rotatably driven about its axis to cause the welding tool to traverse a circumference of the workpiece. Prototype welding equipment developed by the assignee of the present application employed a rotary drive mechanism that drove the workpiece by means of an arm that engaged the workpiece and rotated about an axis coinciding with the axis of the workpiece. Thus, the torque arm of the drive mechanism was essentially equal to the radius of the workpiece. It will be appreciated that for large-diameter workpieces, the resulting torque requirement for the drive mechanism could be quite large. For instance, assuming a horizontal welding load of 2000 pounds that must be overcome by the drive mechanism, a 16-foot diameter workpiece would require a drive torque of 16,000 foot-pounds.

A further drawback of the prototype center-drive mechanism is that the drive arm tended to flex, which caused imprecise control of the rotational motion of the workpiece. For instance, at the end of a weld when the drive mechanism was stopped and the weld tool was withdrawn from the workpiece, the return of the drive arm to a relaxed condition resulted in some further rotational movement of the workpiece, causing an elongation in the exit "keyhole" formed by the withdrawal of the weld tool. Additionally, when starting the drive mechanism to begin a welding operation, the flexing of the drive arm resulted in some backlash such that movement of the workpiece did not begin precisely when commanded and the speed of the workpiece was not as uniform as desired. These problems were noted in welding 3-foot diameter tanks. With larger-diameter structures, the problems caused by drive arm flexure likely would be even greater.

SUMMARY OF THE INVENTION

The present invention provides tooling and methods that, at least in preferred embodiments, overcome some or all of the problems noted above. In accordance with a first aspect of the invention, a back-up tooling apparatus is provided for backing up an inner surface of a hollow cylindrical workpiece to be friction stir welded along a circumferential weld path. The back-up tooling apparatus comprises a plurality of shoes each having an arcuate shape in a circumferential direction of the workpiece, the shoes being configured to mate end-to-end with one another so as to form a substantially continuous ring having an outer diameter approximately equal to a diameter of the inner surface of the workpiece. The shoes are supported by a radially expandable support having a plurality of support arms respectively attached to the plurality of shoes. The expandable support is operable to retract the support arms and shoes inwardly to permit the back-up tooling apparatus to be inserted inside the workpiece, and is operable to extend the support arms and shoes outwardly to cause the shoes to mate with one another in end-to-end relation to form the continuous ring and to urge the ring against the inner surface of the workpiece. To enable the shoes to be retracted inwardly, alternate shoes in the circumferential direction preferably are axially staggered with respect to the remaining shoes when the expandable support is retracted.

In accordance with a preferred embodiment of the invention, the expandable support comprises at least first and second axially spaced central support members that are relatively movable toward and away from each other along an axis of the expandable support, and each shoe has support arms that are pivotally attached to the shoe and extend from opposite sides of the shoe to the central support members. Relative movement of the central support members toward each other causes the shoe to be moved radially outward and movement of the central support members away from each other causes the shoe to be moved radially inward.

The expandable support preferably comprises a screw-feed device having the first central support member threadingly mounted on a rotatable feed screw, the feed screw being rotated in one direction or another to cause the first central support member to move relatively toward or away from the second central support member. To provide the axial staggering of some shoes relative to other shoes when the shoes are retracted, the back-up tooling apparatus preferably includes a third central support member threadingly mounted on the rotatable feed screw axially spaced from the first central support member. Alternate shoes in the circumferential direction are connected via support arms to the first central support member and the remaining shoes are connected via support arms to the third central support member. Thus, when the first and third central support members are moved away from the second central support member to retract the shoes, the shoes connected to the first and third central support members are moved different distances in the axial direction.

To facilitate mating of the shoes when they are expanded outward, the mating end faces of circumferentially adjacent shoes advantageously are complementarily angled relative to the axial direction.

It is further advantageous to configure the shoes so that they overlap in the circumferential direction when the shoes are expanded to form the ring such that weld pressure exerted radially inward on the overlapping end portions causes the overlapping end portions to be forced together. The joints between adjacent shoes thus are "self-sealing", which helps prevent the creation of excessively large gaps between shoes. Such gaps could result in plasticized weld metal being forced through the gaps. To further improve the connection between shoes, a seal material advantageously is disposed between mating end faces of the overlapping end portions of the shoes. The seal material can be any material that is softer than the shoes and will not melt or be forced out from between shoes under the temperatures and pressures expected to be imposed on the material during use. Examples of suitable seal material include copper and polytetrafluoroethylene.

The support and rigidity provided by the back-up tooling apparatus can be enhanced by careful construction of the shoes. More particularly, a preferred embodiment of the invention provides an apparatus wherein some of the shoes are configured to become circumferentially narrower in a radially outward direction, and the other shoes are configured to become circumferentially wider in the radially outward direction. The narrowing shoes are alternately disposed with respect to the widening shoes about the circumference so as to form an interlocking arrangement. The effect of this arrangement is that force exerted radially outward on a narrowing shoe is transmitted to adjacent widening shoes. In other words, the narrowing shoes tend to support the widening shoes, and the entire ring is thus made more rigid.

The invention in other embodiments also helps alleviate the problem of thermal growth of the workpiece. To this end, the back-up tooling apparatus preferably includes an outer restraining device configured to encircle an outer surface of the workpiece and operable to resist outward expansion of the workpiece. The restraining device advantageously comprises a pair of ring-shaped restraining bars adapted to be mounted about the workpiece on opposite sides of the circumferential weld path. Each restraining bar conveniently is formed in two or more arcuate segments that are fastened together to clamp about the workpiece.

In still other embodiments, the invention also helps alleviate the problem of inaccurate driving of the workpiece caused by flexure in the drive system. Thus, in accordance with a preferred embodiment of the invention, the back-up tooling apparatus includes a drive device in engagement with an outer surface of the workpiece and operable to rotate the workpiece about its axis. The drive device preferably comprises a cable attached to and wrapped about the workpiece and a winch connected to the cable for pulling the cable to rotate the workpiece. Preferably, the cable is attached to the restraining device that encircles the workpiece. Alternatively, a member having an outer geared surface is affixed about the workpiece and the drive device comprises at least one rotatably driven gear meshed with the geared surface for rotating the workpiece. Thus, the torque required to drive the workpiece is essentially independent of the diameter of the workpiece. Flexure in the drive device can be reduced or substantially eliminated so that more-precise control of the workpiece movement can be attained.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 6 is an end elevation of a restraining device for reducing thermal growth of a workpiece during a welding operation;

FIG. 7 is an end elevation showing a workpiece and a cable device for rotatably driving the workpiece;

FIG. 8 is an enlarged fragmentary end elevation showing a cable attached to a restraining device that is clamped about a workpiece; and FIG. 9 is an end elevation showing a workpiece and a geared drive device for rotatably driving the workpiece.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
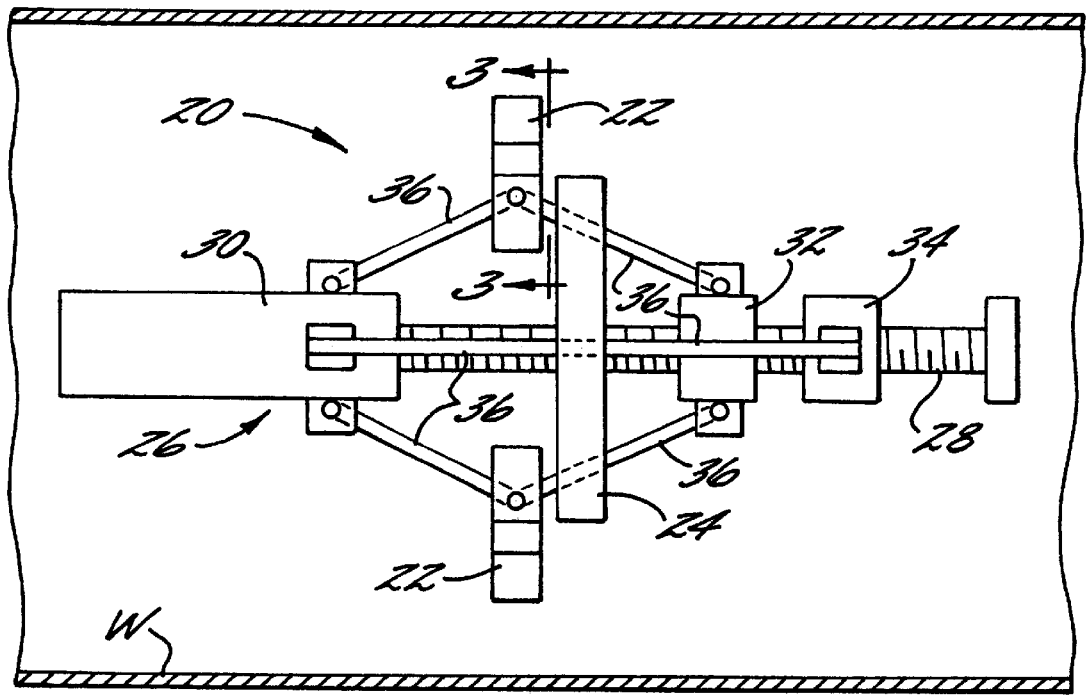
FIG. 1 is a side elevation of a back-up tooling apparatus in accordance with a preferred embodiment of the invention, shown in a retracted condition inside a cylindrical workpiece to be welded.
Figure 2:
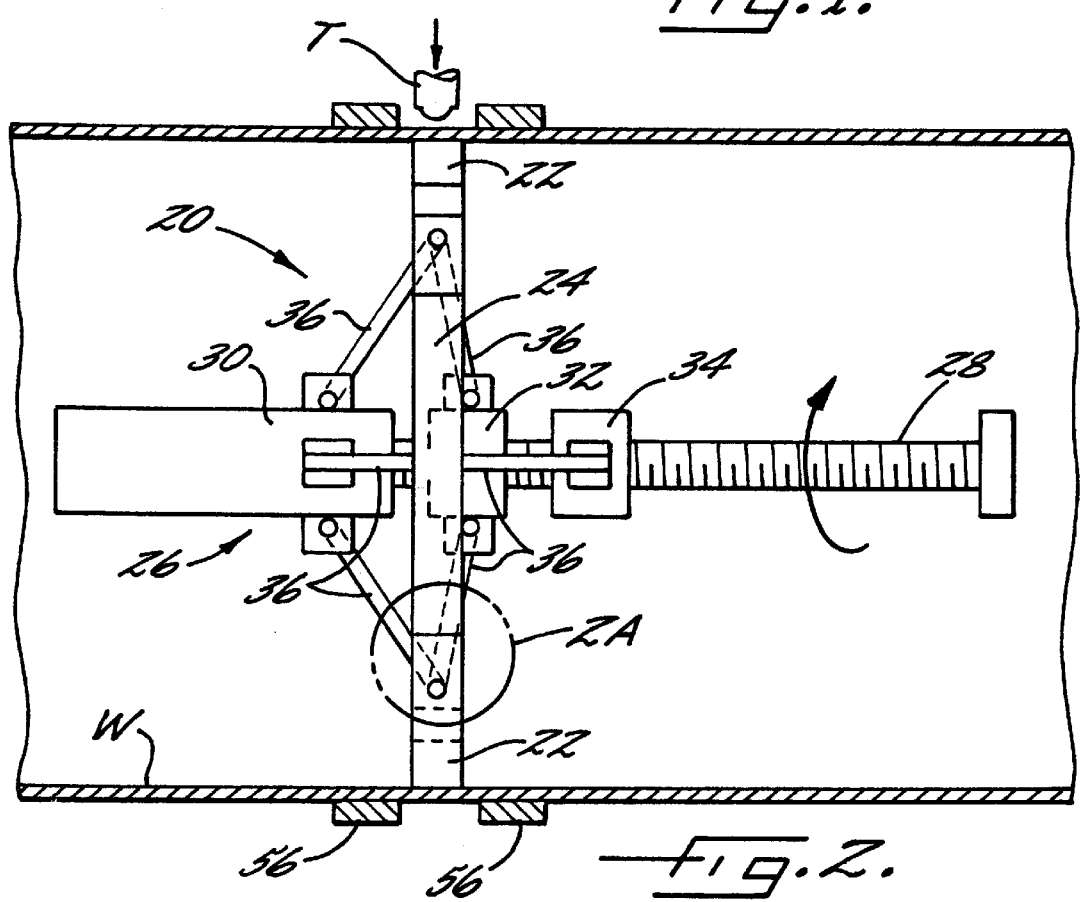
FIG. 2 is a side elevation similar to FIG. 1, but with the apparatus in an expanded condition engaging the inner surface of the workpiece.
Figure 3:
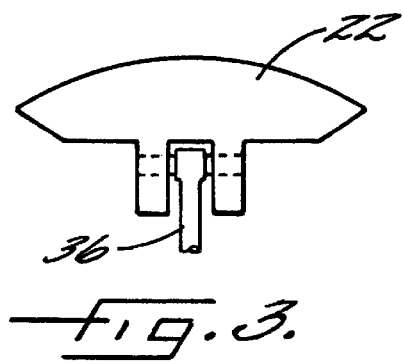
FIG. 3 is an end elevation of one of the shoes of the apparatus in FIG. 1.

With reference to FIGS. 1–3, a back-up tooling apparatus 20 in accordance with a preferred embodiment of the invention is shown. In FIGS. 1–2, the apparatus is shown inside a cylindrical workpiece W to be welded along a circumferential weld path by a friction stir welding tool T (FIG. 2) that is disposed outside the workpiece W. The friction stir welding process itself is known and thus will not be described further herein. The process is described in general in U.S. Pat. No. 5,460,317, the entire disclosure of which is incorporated herein by reference. Suffice it to say here that the welding tool T is rotated about its axis and is plunged in a direction generally along its axis into the material of the workpiece to be welded. Friction between the tool and the material causes the material to become plastic. The welding tool and workpiece are moved relative to each other so that the welding tool traverses a path through the workpiece. A shoulder on the tool engages the outer surface of the workpiece, and as the tool is rotated and advanced through the workpiece, axial force on the tool causes the shoulder to frictionally engage and plasticize the material. In the instant case, the welding tool T preferably is held in one place and the workpiece W is rotated about its axis to cause the tool T to traverse a circumferential welding path. Although not shown in the drawings, it will be understood that the workpiece W being welded actually consists of two parts having cylindrical portions that are abutted against each other end-to-end to form a circumferential joint, and this joint defines the welding path that is traversed by the welding tool T.

In a friction stir welding process, some sort of backing member is required on the back side of the workpiece in order to contain the welding pressure so that plasticized weld metal is not forced through the back side of the workpiece. The backing member in many cases also supports the workpiece against the large forces that are imposed on it by the welding tool.

The axial force on the welding tool T can be quite large, for example 2000–4000 pounds or more, depending on the material and thickness of the workpiece and other factors. As the welding tool progresses through the workpiece along the welding path, a large sideward force is also exerted on the workpiece. These welding forces are transmitted to and absorbed by the backing member. The backing member preferably should be sufficiently rigid to prevent excessive deformations of the backing member and workpiece.

In accordance with the present invention, the back-up tooling apparatus 20 is provided for stabilizing the workpiece W and for containing the weld pressure. The apparatus 20 includes a plurality of arcuate shoes 22 and 24 that can be assembled end-to-end to form a substantially continuous ring. The apparatus 20 also includes an expandable support 26 that supports the shoes 22, 24 and is operable to retract the shoes inward as shown in FIG. 1 to reduce the overall diameter of the apparatus so that it can be inserted through an opening in the end of the workpiece (which opening may be smaller in diameter than the portion of the workpiece to be welded), and to expand the shoes outward once the apparatus is inside the workpiece, as shown in FIG. 2, so that the shoes mate with one another to form a ring that engages the inner surface of the workpiece.

The expandable support 26 in the preferred embodiment illustrated comprises a rotatable feed screw 28, a plurality of axially spaced central support members 30, 32, and 34 at least two of which (i.e., the members 32 and 34) are threadingly mounted on the feed screw 28, and a plurality of support arms 36 pivotally connected between the shoes 22, 24 (see FIG. 3) and the central support members 30, 32, and 34. The central support members 32 and 34 are prevented from rotating along with the feed screw 28 by suitable means (not shown) so that rotation of the feed screw causes the support members 32 and 34 to translate along the feed screw toward the remaining central support member 30. The central support member 30 can also be threadingly mounted on the feed screw 28 on a portion thereof that is threaded with a reverse pitch relative to the portion on which the support members 32 and 34 are mounted, such that rotation of the feed screw 28 causes the support member 30 to also translate toward the other support members 32 and 34. Alternatively, the apparatus 20 can employ more than one independently operable feed screw, with the support members 30–34 mounted on different feed screws so that movement of one of the support members can be controlled independently of movement of the other support members.

Each of the shoes 22 is connected by a support arm 36 to the support member 30 and by another support arm 36 to the support member 32. Similarly, each of the shoes 24 is connected by a support arm 36 to the support member 30 and by another support arm 36 to the support member 34. The shoes 22 preferably are alternately disposed with the shoes 24 about the circumference of the apparatus 20. Thus, translation of the support members 32 and 34 relatively toward the other support member 30 causes the shoes 22 and 24 to be moved in a radial direction. Furthermore, because the support members 32 and 34 are spaced different axial distances from the other support member 30, the shoes 22 undergo relative axial movement with respect to the shoes 24 when the feed screw 28 is rotated to cause translation of the support members. This can be seen by comparing FIG. 1 with FIG. 2. The support members 30–34 and support arms 36 are suitably configured such that the shoes 22, 24 can be moved into end-to-end mating arrangement to form a complete ring with the ends of adjacent shoes in contact with each other.

The shoes 22, 24 preferably are configured so that when they come together to form a complete ring as shown in FIG. 2, the outer diameter of the ring is at least as large as the relaxed inner diameter of the workpiece W. More preferably, the shoes 22, 24 can be configured such that the ring is slightly larger in diameter than the relaxed inner diameter of the workpiece, with the result that expansion of the apparatus 20 against the inner surface of the workpiece applies a pre-load to the workpiece. This can be advantageous, for example, in order to counteract thermal expansion of the workpiece as a result of frictional heating during a welding operation, so that the workpiece does not expand and lift away from the shoes.

Figure 2A:
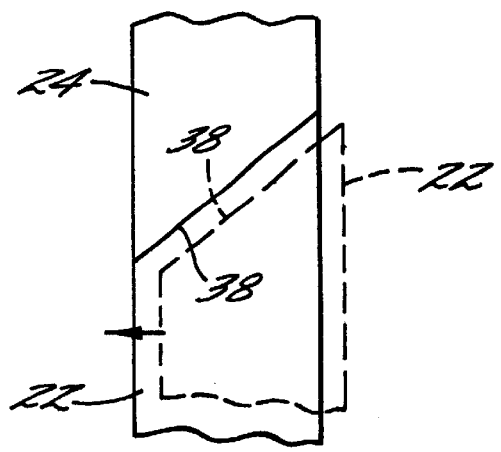
FIG. 2A is an enlarged view of a portion of FIG. 2, showing the feature of angled end faces of the shoes to facilitate mating of the shoes.

To facilitate mating of the shoes 22, 24, it may be advantageous to provide end faces 38 that are angled relative to the axial direction as shown in FIG. 2A. This configuration reduces the likelihood of interference between the shoes as they are moved axially and radially together.

Figure 4:
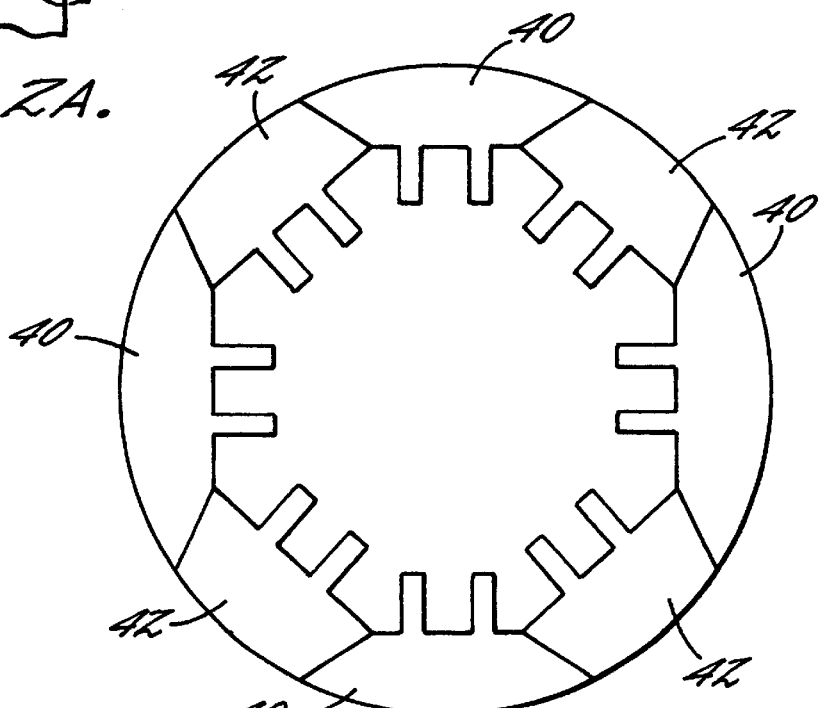
FIG. 4 is an end elevation of another embodiment of the invention, showing a plurality of shoes expanded out to form a substantially continuous ring.

Various numbers and configurations of shoes can be used in accordance with the present invention. Certain shoe configurations, however, may be more advantageous than others. For example, the present invention in preferred embodiments provides shoe configurations that facilitate support of a given shoe by other shoes in the ring. With reference to FIG. 4, a ring is shown made up of shoes 40 alternately disposed with shoes 42 about the circumference. The shoes 40 are configured such that their circumferential width increases in the radially outward direction. Conversely, the shoes 42 are configured such that their circumferential width decreases in the radially outward direction. It will be appreciated, therefore, that a radially inward force imposed on a widening shoe 40 will be transmitted to adjacent narrowing shoes 42. The narrowing shoes 42 thus help support the widening shoes 40 against the forces imposed by the welding tool, thereby reducing the tendency of a given shoe to "sink" under load. The spreading of load from one shoe to other shoes in the ring tends to improve the rigidity and stability of the ring.

Figure 5:
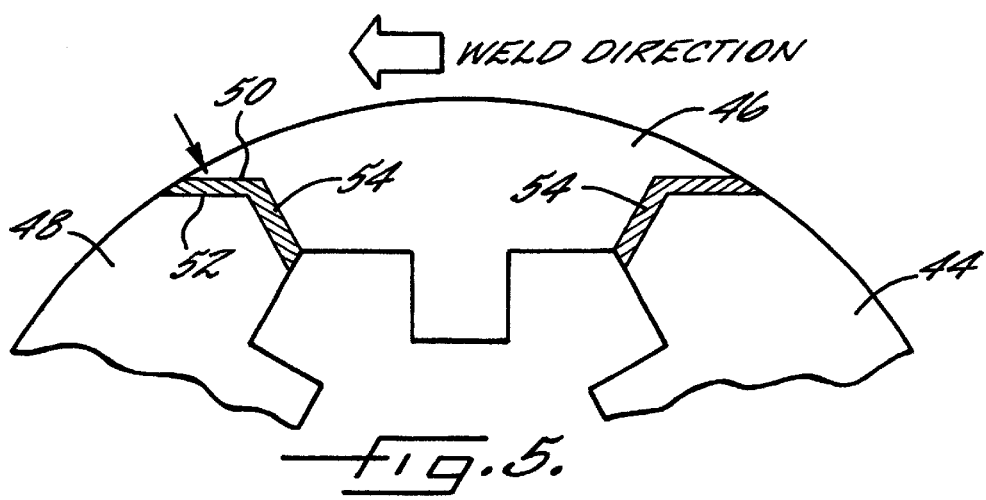
FIG. 5 is a fragmentary end elevation of a ring in accordance with a further embodiment of the invention in which a seal material is disposed between mating end faces of the shoes and the shoes are configured such that weld pressure tends to increase the sealing between shoes.

A further advantageous shoe configuration is shown in FIG. 5. A portion of a ring is shown made up of shoes 44, 46, and 48. The end portions of the shoes overlap in the circumferential weld direction, so that, for example, the end portion of the shoe 46 that overlaps the end portion of the shoe 48 has a mating face 50 that faces inward. The end portion of the shoe 48 has a complementary mating face 52 that faces outward and mates with the face 50. Accordingly, when weld pressure is exerted on the end portion of the shoe 46, the respective mating faces 50 and 52 are forced together, thereby tending to reduce or eliminate any gap therebetween. In a further preferred embodiment of the invention, a sealing material 54 is interposed between the mating faces 50 and 52 to further improve sealing between the shoes. The sealing material 54 can be any material that is softer than the shoes and will not melt or be forced out from between shoes under the temperatures and pressures expected to be imposed on the material during use. Examples of suitable sealing materials include copper and polytetrafluoroethylene.

With reference to FIGS. 2 and 6, a further aspect of the invention is the provision of a restraining device for preventing or reducing thermal growth of a workpiece so as to maintain proper contact between the workpiece and the shoes of the back-up tooling apparatus. The restraining device is substantially rigid and encircles the outer surface of the workpiece. Preferably, the restraining device comprises a pair of ring-shaped restraining bars 56 that can be clamped about the workpiece W on opposite sides of the weld path. Each restraining bar 56 preferably is formed in two or more arcuate segments that are fastened together, such as by bolts 58 (FIG. 6), to form a full ring. Alternatively or in addition to using the restraining device, the workpiece can be cooled by circulating a gaseous coolant through the interior of the workpiece during a welding operation in order to reduce thermal expansion of the workpiece.

The invention also provides improved devices and methods for rotatably driving a workpiece to effect a circumferential friction stir weld. FIG. 7 shows a cable-drive device for rotating a workpiece. The cable-drive device includes a rotatable winch 60 operable to wind a cable 62 onto the winch. The cable 62 is wrapped about the workpiece W and affixed thereto by a suitable fastening arrangement. As shown in FIG. 8, one such fastening arrangement is the restraining bar 56 described above, which can be constructed to securely clamp about the workpiece with sufficient clamping force that the restraining bar will not slip relative to the workpiece. The cable 62 is affixed to the restraining bar 56 (or to another fastening arrangement) at one end, and the other end of the cable is wound about the winch 60. The winch 60 is operated to wind the cable 62 onto the winch so as to rotatably drive the workpiece.

An alternative drive device in accordance with the invention is shown in FIG. 9. In this embodiment, a member 64 having a geared outer surface is affixed about the workpiece W, and at least one rotatable drive gear 66 meshes with the member 64 and is rotatably driven to rotate the workpiece. The gear teeth on the geared outer surface of the member 64 and on the drive gear 66 are not shown in FIG. 9

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A back-up tooling apparatus for backing up an inner surface of a hollow cylindrical workpiece to be friction stir welded along a circumferential weld path, comprising:

a plurality of shoes each having an outer surface that is arcuate in a circumferential direction of the workpiece, the shoes being configured to mate end-to-end with one another so as to form a substantially continuous ring having an outer diameter approximately equal to a diameter of the inner surface of the workpiece; and a radially expandable support having a plurality of support arms respectively attached to the plurality of shoes, the expandable support being operable to extend the support arms and shoes outwardly to cause the shoes to mate with one another in end-to-end relation to form said continuous ring and to urge the shoes against the inner surface of the workpiece, wherein the expandable support is operable to retract the shoes inward to reduce the diameter of the apparatus, and wherein alternate shoes in the circumferential direction are axially staggered with respect to the remaining shoes when the expandable support is retracted.

2. The back-up tooling apparatus of claim 1, wherein the expandable support comprises at least first and second central support members that are relatively movable toward and away from each other along an axis of the expandable support, and wherein each shoe has support arms that are pivotally attached to the shoe and to the central support members such that relative movement of the central support members toward each other causes the shoe to be moved radially outward and movement of the central support members away from each other causes the shoe to be moved radially inward.

3. The back-up tooling apparatus of claim 1, wherein the expandable support comprises a screw-feed device having at least the first central support member threadingly mounted on a rotatable feed screw, the feed screw being rotated in one direction or another to cause the first central support member to move relatively toward or away from the second central support member.

4. The back-up tooling apparatus of claim 3, further comprising a third central support member axially spaced from the first central support member and axially movable with respect to the second central support member, alternate shoes in the circumferential direction being connected via support arms to the first central support member and the remaining shoes being connected via support arms to the third central support member, the expandable support being configured to cause axial staggering of said alternate shoes with respect to said remaining shoes when the first and third central support members are moved away from the second central support member to retract the shoes.

5. The back-up tooling apparatus of claim 4, wherein the central support members are mounted on a common feed screw.

6. The back-up tooling apparatus of claim 2, wherein mating end faces of circumferentially adjacent shoes are angled relative to the axial direction.

7. A back-up tooling apparatus for backing up an inner surface of a hollow cylindrical workpiece to be friction stir welded along a circumferential weld path, comprising:

a plurality of shoes each having an outer surface that is arcuate in a circumferential direction of the workpiece, the shoes being configured to mate end-to-end with one another so as to form a substantially continuous ring having an outer diameter approximately equal to a diameter of the inner surface of the workpiece; and a radially expandable support having a plurality of support arms respectively attached to the plurality of shoes, the expandable support being operable to extend the support arms and shoes outwardly to cause the shoes to mate with one another in end-to-end relation to form said continuous ring and to urge the shoes against the inner surface of the workpiece, wherein mating end portions of circumferentially adjacent shoes are configured to overlap in the circumferential direction when the shoes are expanded to form the ring such that weld pressure exerted radially inward on the overlapping end portions causes the overlapping end portions to be forced together.

8. The back-up tooling apparatus of claim 7, further comprising a seal material disposed between mating end faces of the overlapping end portions of the shoes.

9. A back-up tooling apparatus for backing up an inner surface of a hollow cylindrical workpiece to be friction stir welded along a circumferential weld path, comprising:

a plurality of shoes each having an outer surface that is arcuate in a circumferential direction of the workpiece, the shoes being configured to mate end-to-end with one another so as to form a substantially continuous ring having an outer diameter approximately equal to a diameter of the inner surface of the workpiece;

a radially expandable support having a plurality of support arms respectively attached to the plurality of shoes, the expandable support being operable to extend the support arms and shoes outwardly to cause the shoes to mate with one another in end-to-end relation to form said continuous ring and to urge the shoes against the inner surface of the workpiece; and a restraining device configured to encircle an outer surface of the workpiece and operable to resist outward expansion of the workpiece.

10. The back-up tooling apparatus of claim 9, wherein the restraining device comprises a pair of ring-shaped restraining bars adapted to be mounted about the workpiece on opposite sides of the circumferential weld path.

11. The back-up tooling apparatus of claim 10, wherein the restraining bars are formed of a heat-conducting material so as to operate as a heat sink.

12. The back-up tooling apparatus of claim 10, further comprising a drive device in engagement with an outer surface of the workpiece and operable to rotate the workpiece about its axis.

13. The back-up tooling apparatus of claim 12, wherein the drive device comprises a cable attached to and wrapped about the workpiece and a winch connected to the cable for pulling the cable to rotate the workpiece.

14. The back-up tooling apparatus of claim 13, further comprising a member having an outer geared surface, the member being affixed about the workpiece, and wherein the drive device comprises at least one rotatably driven gear meshed with the geared surface for rotating the workpiece.

15. A back-up tooling apparatus for backing up an inner surface of a hollow cylindrical workpiece to be friction stir welded along a circumferential weld path, comprising:

a plurality of shoes each having an outer surface that is arcuate in a circumferential direction of the workpiece, the shoes being configured to mate end-to-end with one another so as to form a substantially continuous ring having an outer diameter approximately equal to a diameter of the inner surface of the workpiece, each shoe being in contact with shoes on either side thereof;

the shoes being alternately configured to become circumferentially narrower and wider in a radially outward direction to form an interlocking arrangement such that force exerted radially outward on a narrowing shoe is transmitted to adjacent widening shoes, and wherein inward-facing end faces of the widening shoes overlap outward-facing end faces of adjacent narrowing shoes, and further comprising a seal material disposed between the overlapping end faces.

16. The back-up tooling apparatus of claim 15, wherein the seal material comprises a strip of material having a lower hardness than the shoes.

* * * * *

UNITED STATES PATENT AND TRADEMARK OFFICE
CERTIFICATE OF CORRECTION

PATENT NO. : 6,257,479 B1
DATED : July 10, 2001
INVENTOR(S) : Litwinski et al.

Page 1 of 1

It is certified that error appears in the above-identified patent and that said Letters Patent is hereby corrected as shown below:

Column 8,
Line 55, "claim 1" should read -- claim 2 --.

Column 9,
Line 10, "claim 2" should read -- claim 1 --.

Column 10,
Line 14, "claim 10" should read -- claim 9 --;
Line 22, "claim 13" should read -- claim 12 --.

Signed and Sealed this

First Day of January, 2002

Attest:

Attesting Officer

JAMES E. ROGAN
Director of the United States Patent and Trademark Office